(12) United States Patent
Ekholm et al.

(10) Patent No.: US 8,075,700 B2
(45) Date of Patent: Dec. 13, 2011

(54) METHOD OF CLEANING A FILTER

(75) Inventors: Michael Ekholm, Minneapolis, MN (US); Dean Brabec, North Branch, MN (US); Tom Steinke, Columbia Heights, MN (US); Steve Uban, Stillwater, MN (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 12/942,435

(22) Filed: Nov. 9, 2010

(65) Prior Publication Data
US 2011/0056526 A1 Mar. 10, 2011

Related U.S. Application Data

(62) Division of application No. 11/188,819, filed on Jul. 25, 2005, now Pat. No. 7,867,395.

(51) Int. Cl.
*B08B 5/00* (2006.01)
*B01D 25/32* (2006.01)

(52) U.S. Cl. ............... 134/22.12; 134/22.18; 134/34; 210/798; 210/767; 210/170.09

(58) Field of Classification Search ............ 134/10, 134/22.1, 22.18, 34, 37, 42; 210/170.01, 210/170.09, 323.1, 222.01, 767, 798
See application file for complete search history.

(56) References Cited

U.S. PATENT DOCUMENTS

| 3,526,547 | A |   | 9/1970 | Shock |   |
|---|---|---|---|---|---|
| 4,289,425 | A |   | 9/1981 | Ootsu |   |
| 4,818,420 | A | * | 4/1989 | Mims | 210/798 |
| 5,013,457 | A | * | 5/1991 | Mims | 210/741 |
| 5,468,397 | A |   | 11/1995 | Barboza et al. |   |
| 6,517,724 | B1 | * | 2/2003 | Malone | 210/618 |
| 2002/0139738 | A1 |   | 10/2002 | Fujie et al. |   |
| 2003/0010691 | A1 | * | 1/2003 | Broussard | 210/170 |

FOREIGN PATENT DOCUMENTS

| SU | 842145 | 6/1981 |
|---|---|---|
| SU | 985214 | 12/1982 |

* cited by examiner

*Primary Examiner* — Michael Barr
*Assistant Examiner* — Saeed T Chaudhry
(74) *Attorney, Agent, or Firm* — Patterson & Sheridan, LLP

(57) ABSTRACT

A method and apparatus for a backwash system for cleaning an underwater intake filter assembly. The backwash system includes an underwater tank coupled on one end to a source of compressed fluid and on the other end to the intake screen assembly. The backwash system includes a U-shaped release conduit that is adapted to release a predetermined quantity of fluid to the intake screen in order to clean the filter assembly of waterborne debris.

24 Claims, 9 Drawing Sheets

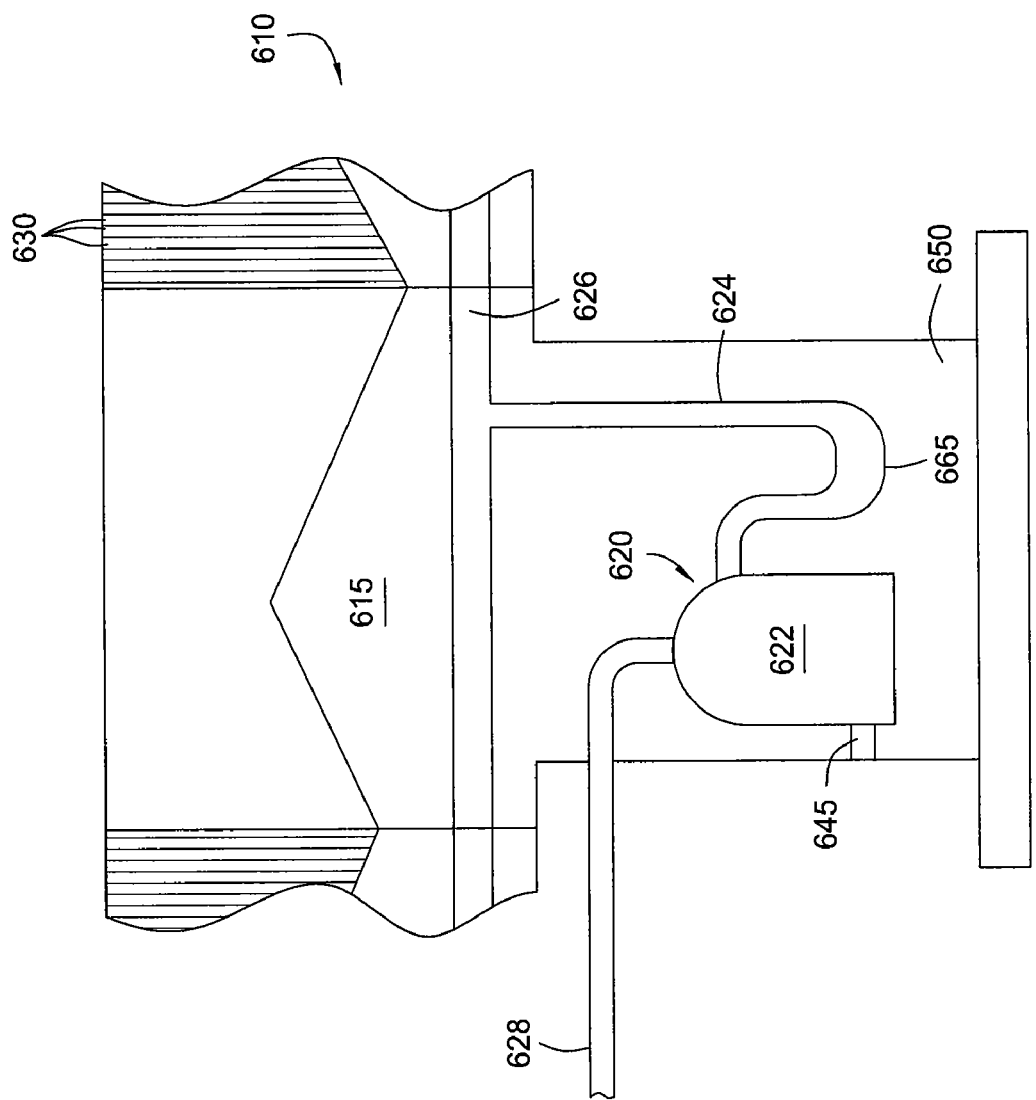

METHOD OF CLEANING A FILTER

CROSS-REFERENCE TO RELATED APPLICATIONS

This application is a divisional of U.S. patent application Ser. No. 11/188,819, filed Jul. 25, 2005, now U.S. Pat. No. 7,867,395, which is herein incorporated by reference in its entirety.

BACKGROUND OF THE INVENTION

1. Field of the Invention

The present invention generally relates to water collection systems placed in bodies of water such as lakes and rivers where the system uses an intake screen to filter water prior to collection. More particularly, this invention relates to a device and system for clearing debris from an intake screen used in water collection systems.

2. Description of the Related Art

Water collection systems are typically used to provide water to end users such as manufacturing plants, cities, irrigation systems, and power generation facilities located adjacent a body of water such as a river, lake, or salt water bodies. The end users may employ this type of system as an alternative to drilling water well or buying water from a municipality. Additionally, use of these systems may be determined by the location of the end user, for example remote locations where water from a municipal source and/or electrical power to operate pumps is not readily available. These water collection systems have the ability to adapt to varying conditions and deliver water efficiently and economically.

These water collection systems typically use an inlet pipe adapted to transport water from a position submerged in the body of water to the end user adjacent the body of water. An inlet pipe is submerged in the body of water and the end of the filtering members, such as ribs, mesh, or perforations disposed on its outer surface. The filtering members are configured to prevent waterborne debris and aquatic life, of a certain size, from entering the inlet pipe.

Depending on the quality of the water source and run-time, the filtering members may become entrained with debris to a point that the water flow may be restricted. If the screen is not cleared of this debris, water flow may eventually be halted. Methods to clear the filtering members include in-situ cleaning by employing divers, or raising the intake screen above the water source to a position where laborers can manually clear it-both of these methods being costly and requiring a temporary shutdown of the water collection system. A novel in-situ clearing method was recently developed by Johnson Screens™ of St. Paul, Minn. in the Hydroburst™ system, which vastly reduces clearing cost and eliminates downtime.

In one mode of operation, the Hydroburst™ system uses sensors to monitor the inlet pipe pressure. When a low pressure is sensed, indicating at least a part of the open area of the screen is covered, a signal is sent to an on shore compressor configured to pump air to a manifold within the intake screen. The manifold delivers a pulse of air that fills the interior region of the intake screen and travels outwardly. The pulse of air, i.e., airburst, is of such force and magnitude that debris is loosened and removed from the filtering members.

The Hydroburst™ system typically includes an extensive air delivery system that comprises a high-output compressor and intricate calculation of piping parameters to deliver a suitable airburst to the intake screen, thus requiring individualized design and specifications for each system. The piping system also uses one or more valves that require replacement and maintenance. Moreover, the compressor used has high electrical requirements that make the system less attractive for remote locations.

Therefore, there is a need in the art for a valveless airburst clearing system to restore and maintain acceptable flow to a water collection system that requires less engineering consideration per installation and employs a smaller, more economical compressed air source.

SUMMARY OF THE INVENTION

The invention generally provides a valveless backwash system for clearing an underwater intake screen. In one embodiment, the backwash system includes a submerged tank filled with water. The tank is in communication with a compressed gas source. Compressed gas is supplied to the tank to a gas/water interface and the water is displaced through a bottom of the tank. The tank is coupled to a conduit and the gas/water interface is communicated to the conduit. When the gas is of sufficient pressure and volume in the tank, the gas is released through a U-shaped portion in the conduit. The conduit is coupled to a manifold adjacent the intake screen and air travels through the conduit and is released into the interior region of the intake screen.

In one embodiment, the manifold is within the intake screen, and the tank is adjacent the intake screen and is coupled to the manifold by a conduit. In another embodiment, the conduit is integrated into an inlet tube coupled to the intake screen. In another embodiment, the tank and manifold are integrated into an inlet tube coupled to the intake screen. In another embodiment, the manifold is adjacent the intake screen and is adapted to direct air from the tank in a direction to clear debris from the intake screen.

In another embodiment, a filter cleaning apparatus for an underwater filter is described. The filter clearing apparatus comprises a source of compressed fluid, an underwater tank, normally filled with water and in communication with the source of fluid, the water displaceable through a bottom portion of the tank as the fluid enters the tank and is collected in an upper portion of the tank, a plumbing portion in communication with the tank and extending towards the filter, the plumbing portion including a U-shaped portion arranged to pass a predetermined quantity of fluid from the tank to the filter as the tank fills with fluid.

In another embodiment, a method of cleaning an underwater filter with a fluid is described having the steps of providing an underwater tank normally filled with water, pumping a fluid into the underwater tank at a predetermined pressure, thereby expelling water from the tank as the tank fills with the fluid, and causing the fluid to pass from the tank into a direction of the filter through a conduit that includes a U-shape when the fluid reaches a sufficient volume in the tank.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6A is a schematic side view of another embodiment of a backwash system.

DETAILED DESCRIPTION

Although the present invention generally relates to water collection systems that use a filtering apparatus for filtering waterborne debris and aquatic life from the collection system, embodiments of the invention may be adapted to other systems that use filtering mechanisms that require periodic cleaning. These systems may employ a filtering apparatus, such as an intake screen, of any shape or size and embodiments described herein are not limited to the shapes, configurations, and uses of the filtering apparatus. The invention also describes a fluid that is used to clear the filtering members of the filtering apparatus. The fluid may be defined broadly as an element or compound in a gaseous state.

Figure 1:
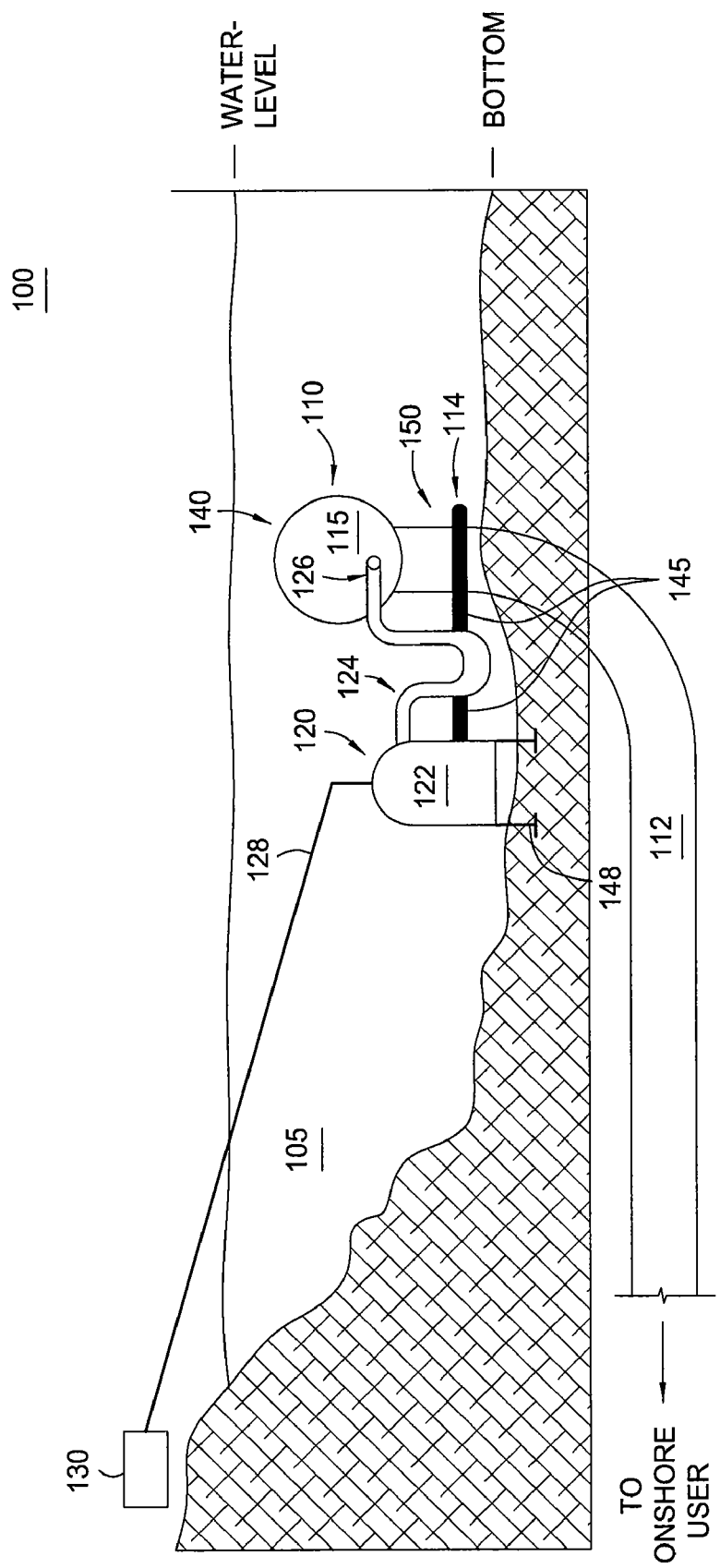
FIG. 1 is a schematic view of an exemplary water collection system.

FIG. 1 is a schematic view of an exemplary collection system 100. The collection system 100 comprises a filtering apparatus, such as an intake screen 110, coupled to an inlet tube 150, both submerged in a source of water, such as a lake 105. The intake screen 110 has an interior region 115 and an exterior area 140 that has at least a portion adapted to allow water from the lake 105, to flow therethrough while filtering that fluid of waterborne debris and aquatic life. The inlet tube 150 is coupled to a supply tube 112 by a flange 114 that is adapted to provide a conduit for collected water to an onshore user. Although the collection system 100 shown is secured in the lake 105 by the supply tube 112 which is below the lake 105 bottom, the system 100 may be secured in other ways, such as with cables and/or buried anchors, a submerged structure, or any method that will maintain a submerged orientation and limit movement of the intake screen 110.

The water may be caused to flow from the lake 105 by a pump coupled to the collection system 100. Alternatively, the water may be caused to flow by hydrostatic pressure, i.e., pressure from the weight of the water and/or current flow, or flow initiated and maintained by gravitational and atmospheric forces.

The collection system 100 includes a backwash system 120 adjacent the intake screen 110. The backwash system 120 includes a tank 122, a distribution member, such as a manifold 126 with a tubular section, such as a conduit 124 therebetween. The tank 122 is coupled to a compressor 130, by a fluid line 128 which may be a rigid or flexible tubular conduit. The backwash system 120 may be secured to the intake screen by a brace 145, or by an anchoring structure 148 to the lake 105 bottom.

Figure 2:
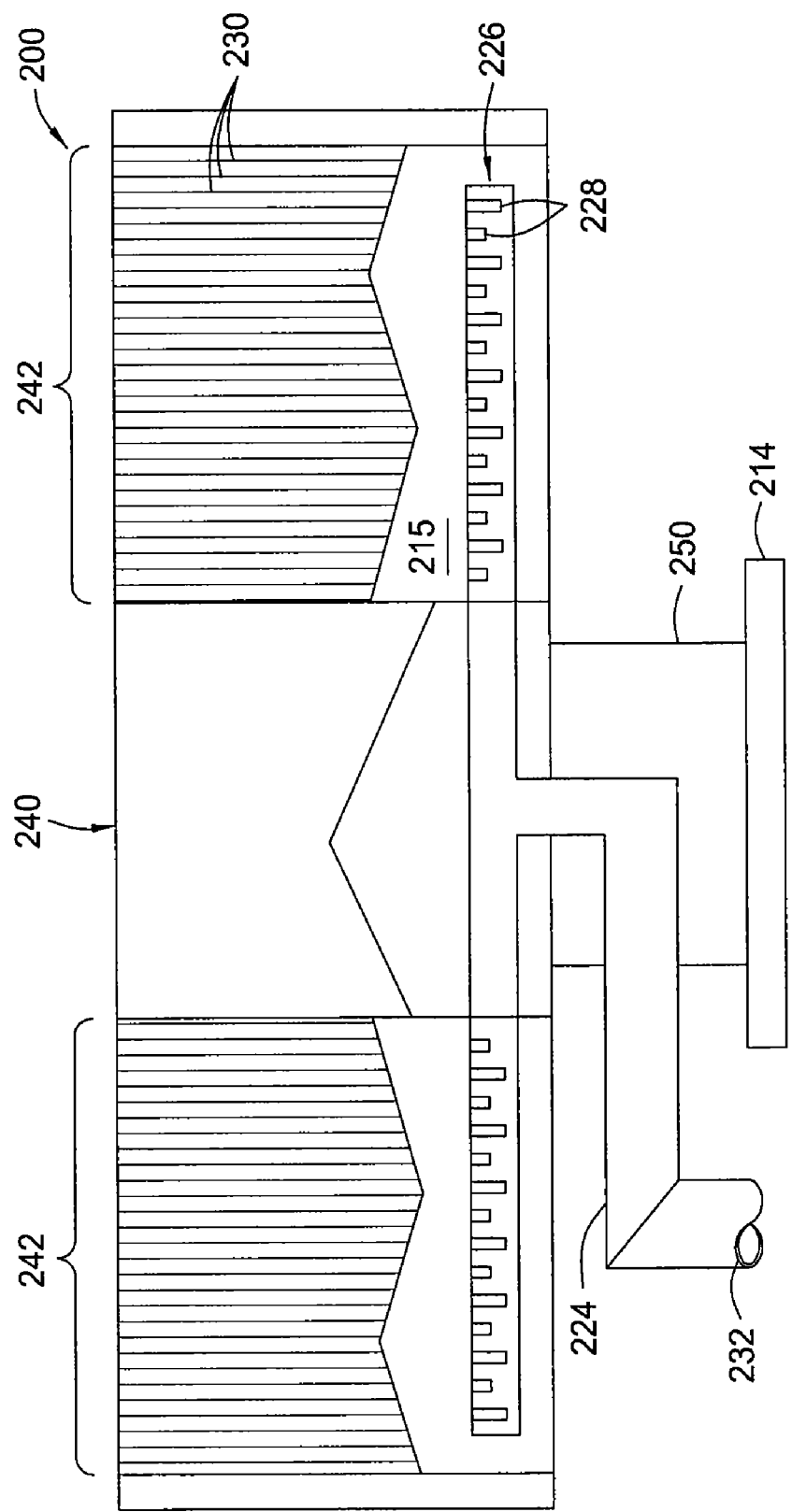
FIG. 2 is a schematic side view of an exemplary intake screen.

FIG. 2 is a schematic view of a typical intake screen assembly 200, which in this embodiment is an elongated cylinder with an inlet tube 250 coupled to a center portion. The intake screen assembly 200 has an exterior surface 240 surrounding an interior region 215. The exterior surface 240 has an open area 242 that is between about 30% to about 90% and is surrounded by a plurality of filtering members 230 configured to prevent waterborne debris and aquatic life from entering the interior region 215. The intake screen assembly 200 also has a manifold 226 within the interior region 215. The manifold 226 has a plurality of orifices 228, such as slits, that are adapted to deliver a pulse of fluid to the interior region 215 of the intake screen assembly 200 through a manifold conduit 224. The manifold conduit 224 is connected to a backwash system by a fluid source connection 232, which may include any coupling mechanism such as a flange or a threaded connection. The interior region 215 of the intake screen assembly 200 may also include a dual pipe flow modifier, which is available from Johnson™) Screens of St. Paul, Minn. The dual pipe flow modifier is configured to increase efficiency of the intake screen by promoting an even flow of water across the entire screen surface area of the screen assembly as compared to conventional passive intake screen designs and is described in U.S. Pat. No. 6,051,131, entitled "Flow Modifier for Submerged Intake Screen," which issued Apr. 18, 2000. That application is incorporated by reference to the extent it is not inconsistent with this application.

In one embodiment, the plurality of orifices 228 in the manifold 326 are configured to direct a fluid, such as air, towards peripheral portions of the interior region 315. In another embodiment, the plurality of orifices 228 are configured to direct the fluid, such as air, towards a lower portion of the interior region 315, thereby causing the air to move radially downward and outward prior to succumbing to buoyant forces and traveling upward. In this manner, the filtering members 230 in the lower region may receive a burst of pressured air of a longer duration and the filtering members 230 in the upper region may receive any residual air that may be propelled by pressure and buoyant forces.

FIGS. 3A-3E show exemplary sequential schematic diagrams of a backwash system 320 submerged in a lake 105 depicting a typical airburst cycle. The backwash system 320 is adapted to deliver a fluid to an interior region 315 of an intake screen assembly 310, via the airburst cycle, to clear debris from the intake screen assembly 310. The backwash system 320 consists of a submerged tank 322 and a manifold 326 coupled by a conduit 324. One end of the conduit 324 is coupled to an upper portion of the tank 322 and the other end is coupled to a manifold 326, with a U-shaped release run 365 there between. It is to be noted that throughout the backwash cycle the intake screen assembly 310 may be in a pumping cycle or the pumping cycle may be temporarily tolled prior to a backwash cycle.

Figure 3A:
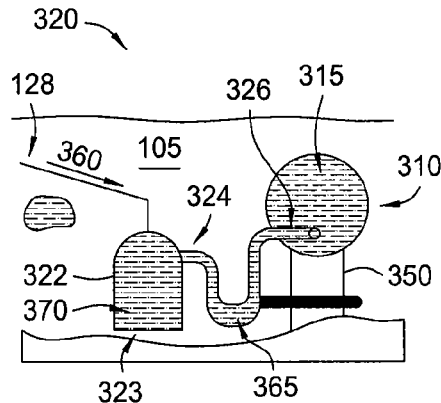
FIGS. 3A-3E show an exemplary cycle of an airburst system.
Figure 3B:
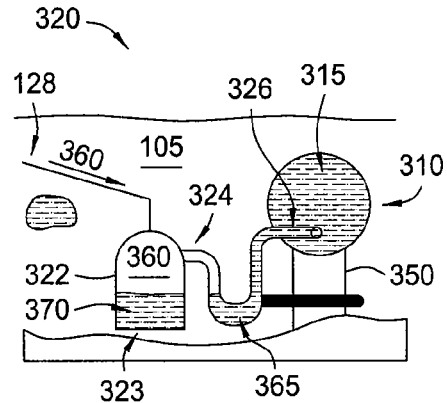

FIG. 3A shows the backwash system 320 and the intake screen in a pumping cycle where the intake screen assembly 310 is collecting water 370 for an onshore user. The tank 322 is filled with water 370 from the lake 105 through an open bottom 323 that may be adapted to filter water as the water enters. Alternatively, water may enter the tank 322 from the manifold 326 through the conduit 324. A fluid line 128 is supplying fluid, (shown as 360 in FIG. 3B), such as air, from an onshore compressor to the tank 322. The compressed fluid may be supplied to the tank 322 at a steady pressure, between about 5 pounds/square inch (psi) to about 45 psi, for example, about 15 psi, and is configured to build a volume in the tank 322 over a period of time. Although the fluid line 128 is shown coupled to an upper portion of the tank 322 as shown, in other embodiments the fluid line may be coupled to a sidewall, or a lower portion, for example, the bottom 323. As an alternative to an onshore compressor, any source of fluid may be used, such as a compressed gas in a container connected to the tank 322 by the fluid line 128. The invention contemplates that the buoyancy of the gaseous fluid will enable accumulation of the fluid 360 in an upper portion of the tank 322.

In reference to FIGS. 3A-3E, an exemplary operation will be described. FIG. 3A shows the tank 322 in a build-up cycle where the fluid 360 is building volume and displacing water 370 in the tank 322 through the bottom 323. The tank 322 is coupled to a conduit 324 and the fluid 360/water 370 interface is communicated to, and reflected in, a portion of the conduit 324 above a release run 365.

Figure 3C:
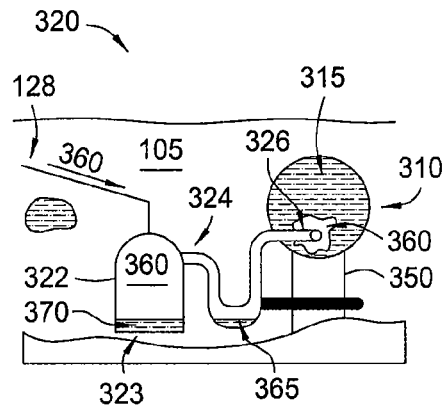

FIG. 3C is a schematic view of the backwash system 320 in a release mode. The fluid 360 is supplied at sufficient pressure to the tank 322 in order to reach equilibrium and overcome the static pressure of the water 370 in the lake 105 when sufficient volume has accumulated. The fluid 360/water 370 interface in the conduit 324 is eliminated and the fluid 360 travels through the release run 365. The fluid 360 travels to the manifold 326 and is released through the plurality of orifices 228 into the interior region 315.

Figure 3D:
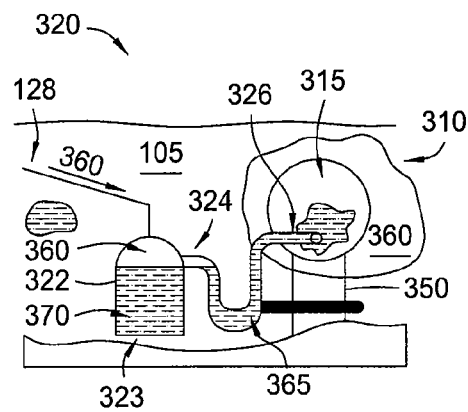

FIG. 3D shows the backwash system 320 in a filter clearing mode. The tank 322 is configured to deliver a volume of fluid 360 to the interior region 315 that is sufficient to displace substantially all of the water 370 in the interior region 315, thereby clearing debris from the filtering members 230 and restoring an acceptable flow through the intake screen assembly 310. In one embodiment, the tank 322 is configured to deliver a volume of fluid 360 to the interior region 315 that is greater than the volume of the interior region 315. In another embodiment, the tank 322 is configured to deliver between about 2 to about 3 times the volume of the interior region 315.

Figure 3E:
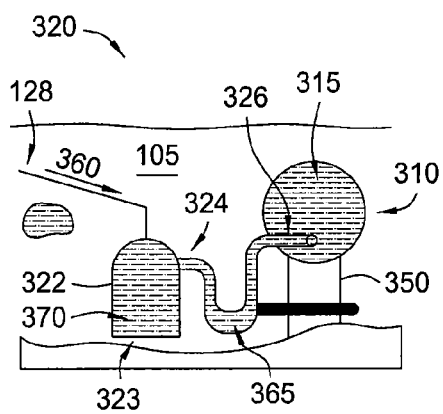

FIG. 3E shows the backwash system 320 in a post release refilling mode. Once the fluid 360 has been released into the interior region 315, the tank 322 is refilled with water 370. In one embodiment, this refilling action may occur through the bottom 323. In another embodiment, the refilling may occur from water flowing from the interior region 315, through the manifold 326 and the conduit 324 to the tank 322. In yet another embodiment, the refilling may occur from a combination of the bottom and the travel route from the interior region to the tank.

In one embodiment, it is contemplated that the compressor 130 (FIG. 1) may continue supplying fluid 360 to the tank 322. In another embodiment, the compressor 130 may be set on a timer to supply fluid 360 to the backwash system at predetermined intervals. In another embodiment, the compressor 130 may be manually actuated to provide fluid 360 to the backwash system at a user's preference. In still another embodiment, the compressor may be in communication with a flow sensor located adjacent the interior region 315 that is adapted to monitor flow in the interior region or the inlet pipe. When the sensor determines a low pressure in the interior region 315, the compressor and hence the backwash system may be activated to restore acceptable flow pressure across the filtering members and in the interior region.

Figure 4A:
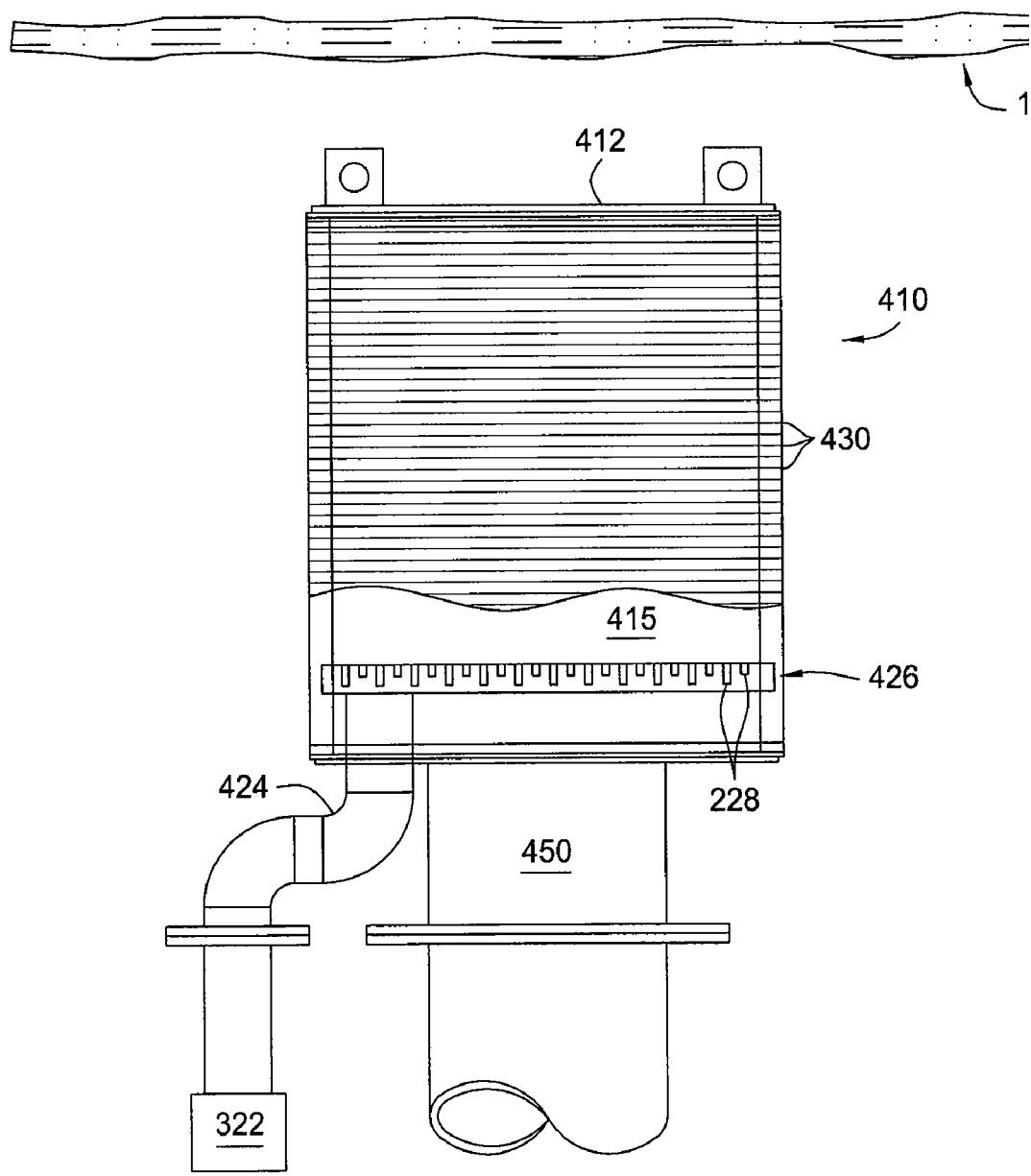
FIG. 4A is a schematic side view of an intake screen in a vertical cylindrical configuration.

FIG. 4A is a schematic view of an intake screen 410 having a vertically oriented cylindrical configuration. The intake screen 410 also has a manifold 426 therein. The intake screen 410 has an interior region 415 in communication with an inlet tube 450 on one end and a solid end plate 412 on the other end. The manifold 426 may be connected to the backwash system 320 by a conduit 424 that is configured to deliver a volume of fluid to the intake screen assembly 410 that is sufficient to clear the intake screen assembly of waterborne debris. The manifold 426 in this embodiment may be annular with a plurality of orifices 228 formed therein. In another embodiment, the manifold 426 may be a plate-like member having a volume formed therein in communication with a plurality of orifices 228. In either embodiment, the plurality of orifices 228 may be adapted to direct a volume of fluid towards peripheral regions of the interior volume 415 or in a vertical direction towards the end plate 412. In both embodiments, the volume of fluid delivered from the backwash system 320 to the interior region 415 that is sufficient to clear waterborne debris and/or aquatic life from the plurality of filtering members 430. In one embodiment, the solid end plate 412 tolls upward vertical movement of the burst of fluid that is delivered by the plurality of orifices 228 and the burst of fluid is of such volume that the fluid travels radially and vertically downward from the solid end plate to clear debris and aquatic life from the plurality of filtering members 430 below the solid end plate.

Figure 4B:
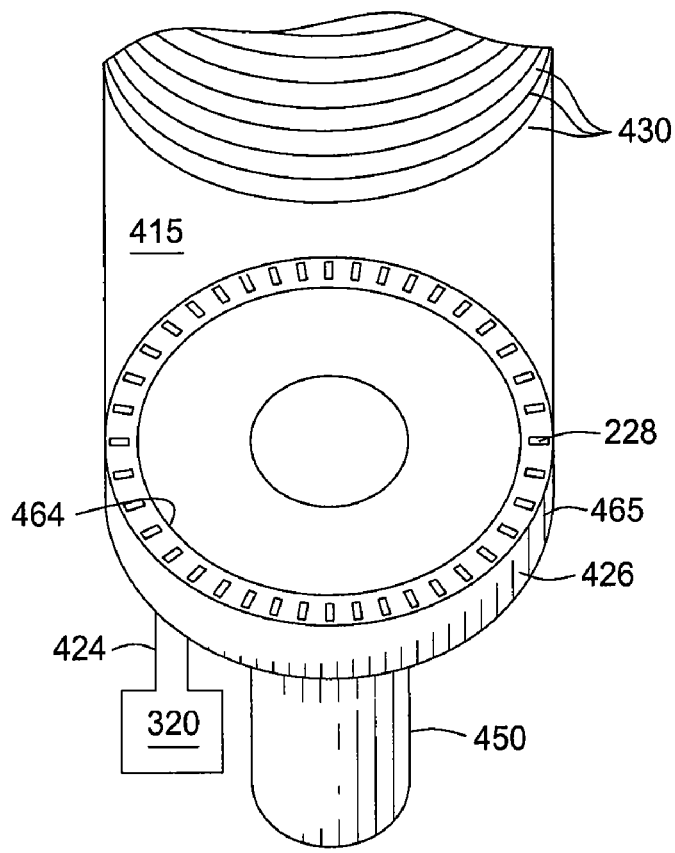
FIG. 4B is a schematic perspective view of an intake screen having a vertical cylindrical configuration.

FIG. 4B is a schematic perspective view of an intake screen 410 having a vertically oriented cylindrical configuration. In his embodiment, the intake screen has a manifold 426 in an annular configuration. The manifold 426 also has a plurality of orifices 228 formed therein and the manifold is in communication with the backwash system 320 by a conduit 424.

Figure 4C:
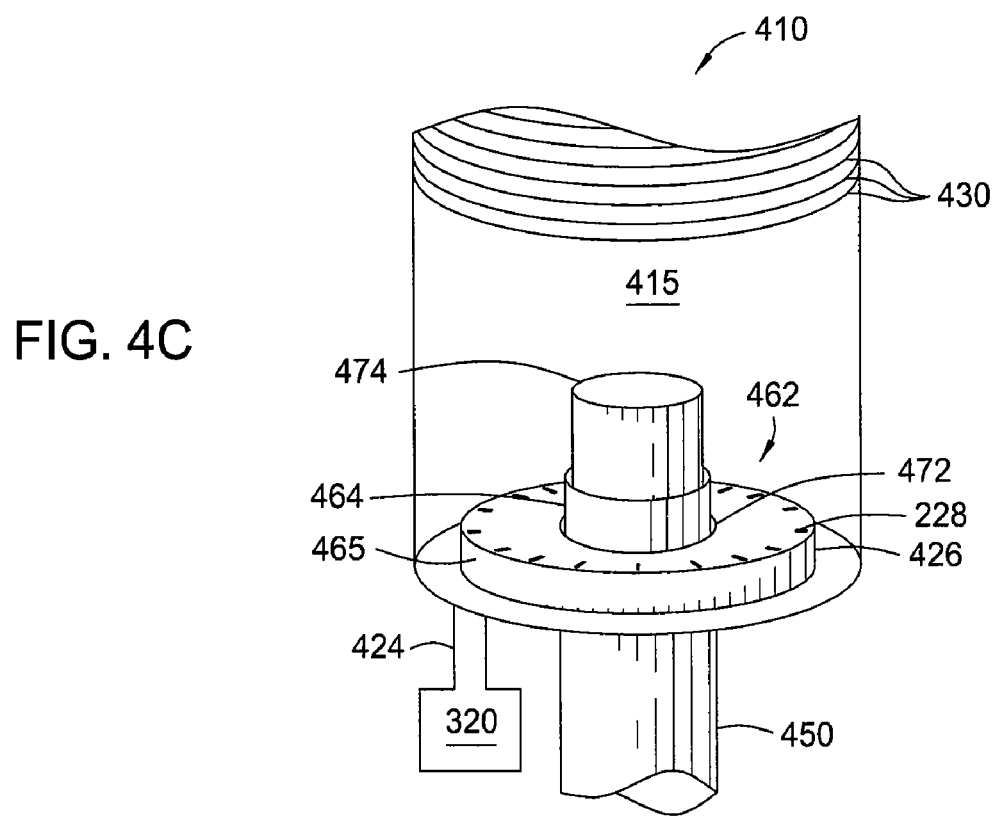
FIG. 4C is a schematic perspective view of another embodiment of an intake screen having a vertical cylindrical configuration.

FIG. 4C is a schematic perspective view of another embodiment of an intake screen 410 having a vertically oriented cylindrical configuration. In this embodiment, the intake screen has an interior region 415 and a dual pipe flow modifier 462 within the interior region 415. A dual pipe flow modifier is available from Johnson™ Screens of St. Paul, Minn. and is configured to increase efficiency of the intake screen by promoting an even flow of water across the entire screen surface area as compared to conventional passive intake screen designs. The flow modifier 462 includes an outer tube 472 and an inner tube 474. In one embodiment, a manifold 426 is integral to the flow modifier 462. The manifold 426 may have an inner diameter 464 formed around the circumference of the outer tube 472. The inner diameter 464 and the outer diameter 465 form a body that is contained within the interior region 415 and includes a plurality of orifices 228 that are configured to direct a burst of fluid towards the interior region 415 of the intake screen 410. In another embodiment, the manifold 426 may be removable and disposed around the circumference of the outer tube 472, thereby forming an inner diameter 464 that is slightly larger than the outer diameter of the outer tube 472. The inner diameter 464 and the outer diameter 465 form a body that is contained within the interior region 415 and includes a plurality of orifices 228 that are configured to direct a burst of fluid towards the interior region 415 of the intake screen 410.

Figure 5A:
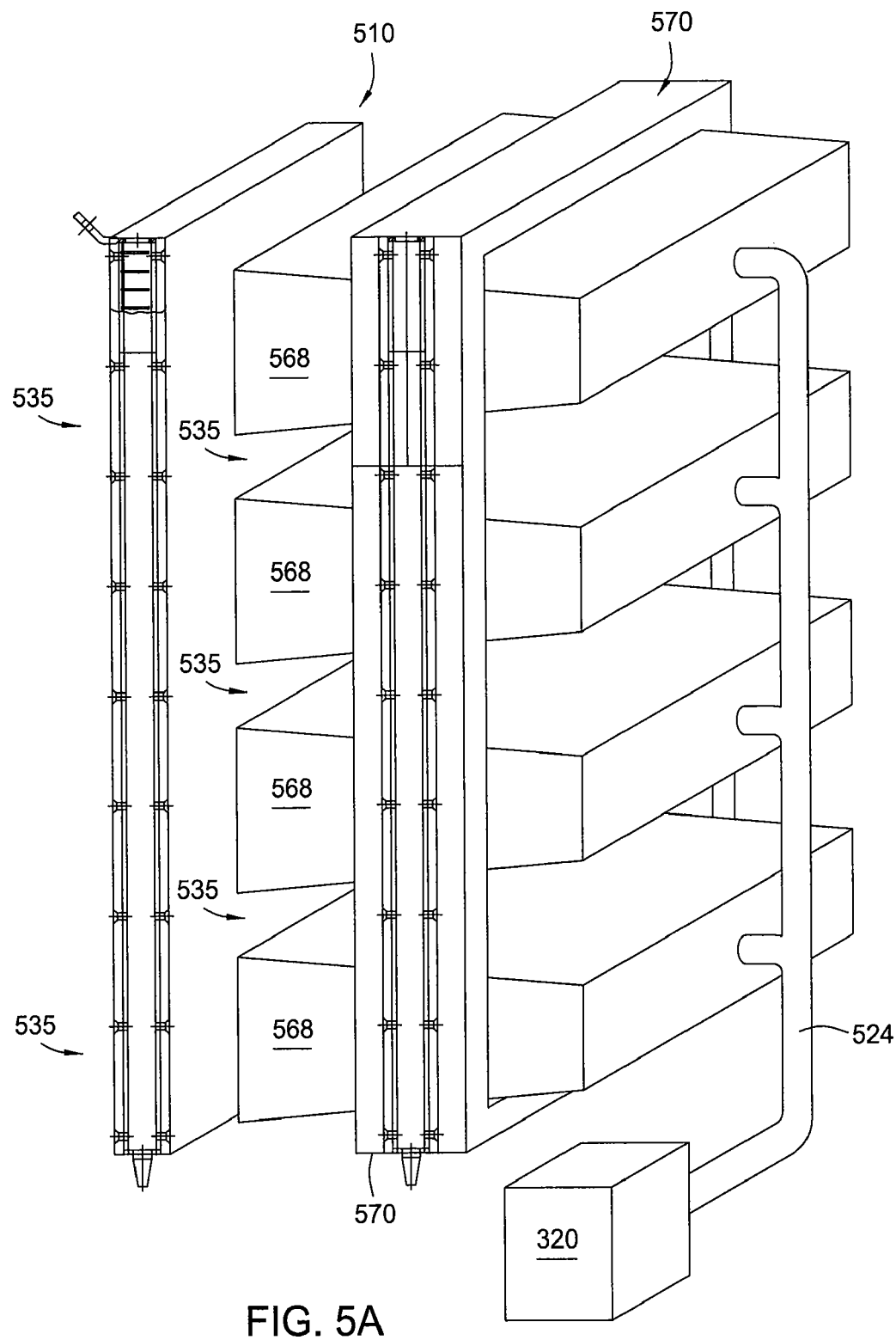
FIG. 5A is a schematic isometric view of an intake screen assembly in a rectangular or flat panel configuration.

FIG. 5A is a schematic isometric view of an intake screen assembly 510 in a rectangular or flat panel configuration. Shown is an intake screen assembly 510 adjacent a manifold frame 570. The manifold frame 570 may be coupled to the intake screen assembly 510 or anchored by suitable stabilizing means downstream of the intake screen assembly 510. The manifold frame 570 includes at least one channeling member 568 that facilitates fluid flow from the backwash system 320 to the intake screen assembly 510. A conduit 524 is coupled to each channeling member 568 and is configured to deliver a burst of fluid from the backwash system 320. Water flow through the intake screen assembly 510 and the channeling members 568 is shown in the direction of arrows 535. A manifold (not shown) is disposed in an interior portion of the channeling member 568 and is coupled to the conduit 524 which is connected to a backwash system 320 that is configured to deliver a volume of fluid to the intake screen assembly 510 that is sufficient to clear the intake screen assembly of waterborne debris.

Figure 5B:
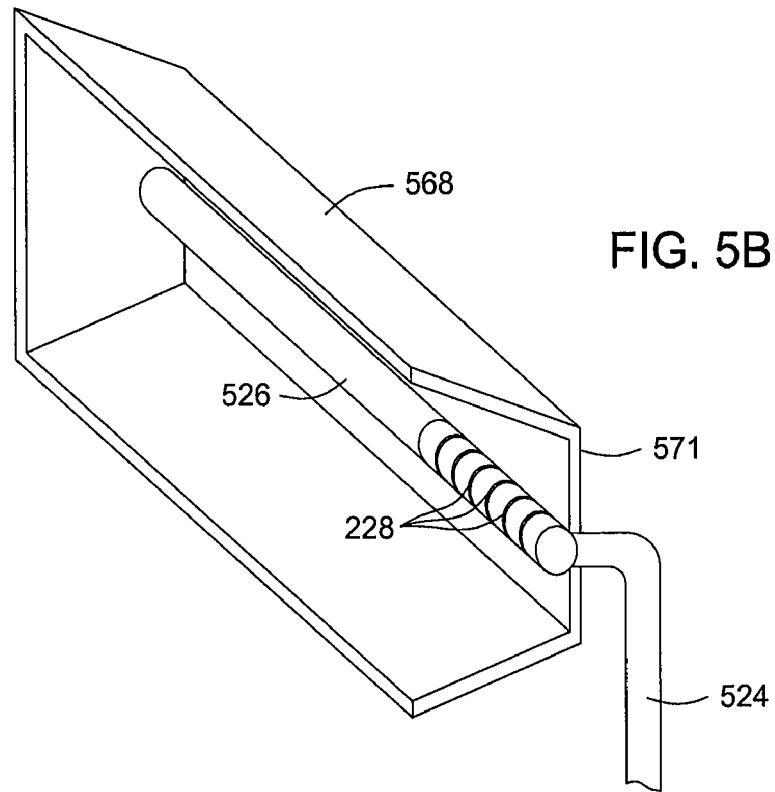
FIG. 5B is an isometric detail view of a portion of a channeling member.

FIG. 5B is an isometric detail view of a portion of a channeling member 568. A manifold 526 is shown coupled to a conduit 524 through a back panel 571 of the channeling member 568. In one embodiment, the back panel 571 of the channeling member 568 is solid with a suitable opening in the back panel 571. In another embodiment, the channeling member 568 does not include a back panel, or is perforated to allow water to flow there through. In either embodiment, the manifold 526 is coupled to the channeling member 568 and includes a plurality of orifices 228 that direct a burst of fluid outwards toward the intake screen. The conduit 524 is connected to a backwash system (not shown) that delivers a volume of fluid to the conduit 524 sufficient to clear waterborne debris and aquatic life from the surface of the intake screen assembly.

Figure 5C:
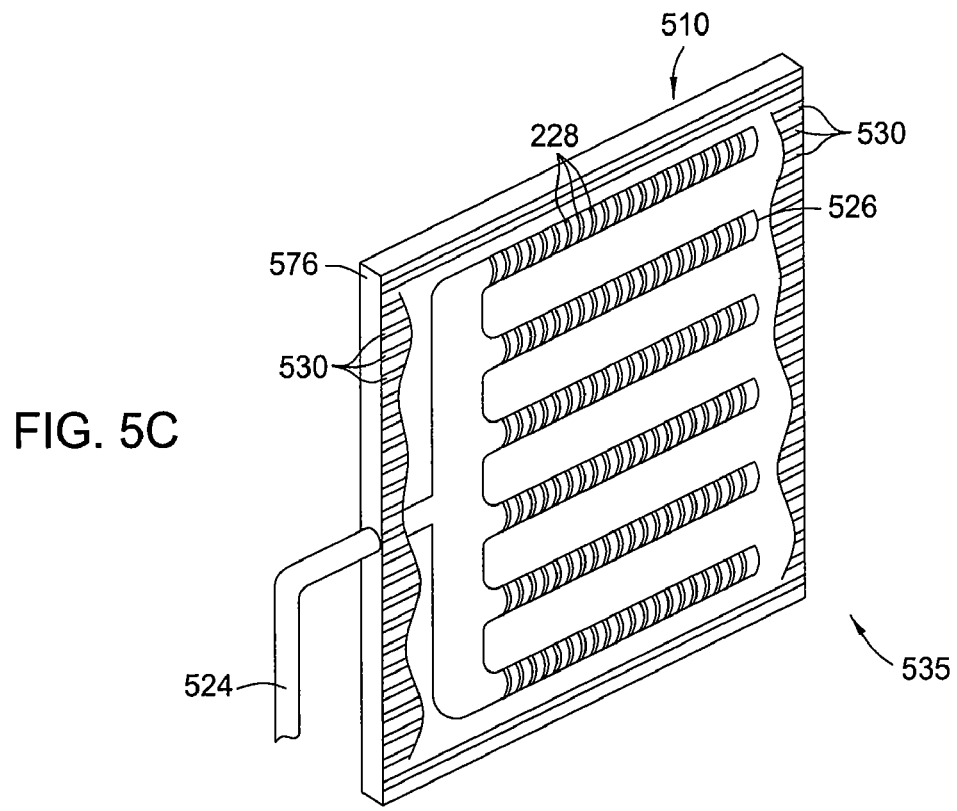
FIG. 5C is another embodiment of an intake screen assembly having a manifold formed within the intake screen assembly frame.

FIG. 5C is another embodiment of an intake screen assembly 510 having a manifold 526 formed within the intake screen assembly frame 576. A portion of the front surface of the intake screen assembly 510 is cut-away in order to show the one configuration of the manifold 526 within the intake screen assembly frame 576. The manifold 526 includes a plurality of orifices 228 that are adapted to direct fluid flow toward a downstream side of the filtering members 530. The manifold is in communication with a backwash system (not shown) by a conduit 524. Water flow is shown in the direction of arrow 535. The backwash system is configured to deliver a volume of fluid to the conduit 524 sufficient to clear waterborne debris and aquatic life from the surface of the intake screen assembly.

FIG. 6A is another embodiment of a backwash system 620 coupled to an intake screen assembly 610 inside the inlet tube 650. Shown is a manifold 626, coupled to a tank 622 with a conduit 624 therebetween that is integrated into the intake screen assembly 610. The backwash system 620 is coupled to the intake screen assembly 610 by a brace 645 and is in communication with a fluid line 628 for supplying compressed fluid to the tank 622. The backwash system 620 is configured to operate similarly as the backwash system depicted in FIGS. 3A-3E. Although not shown, the manifold 626 has a plurality of orifices that are configured to supply fluid from the tank 622 to the interior region of the intake screen assembly 610. This embodiment of the backwash system 620 may also be used in the embodiments depicted in FIGS. 4A-4C.

Figure 6B:
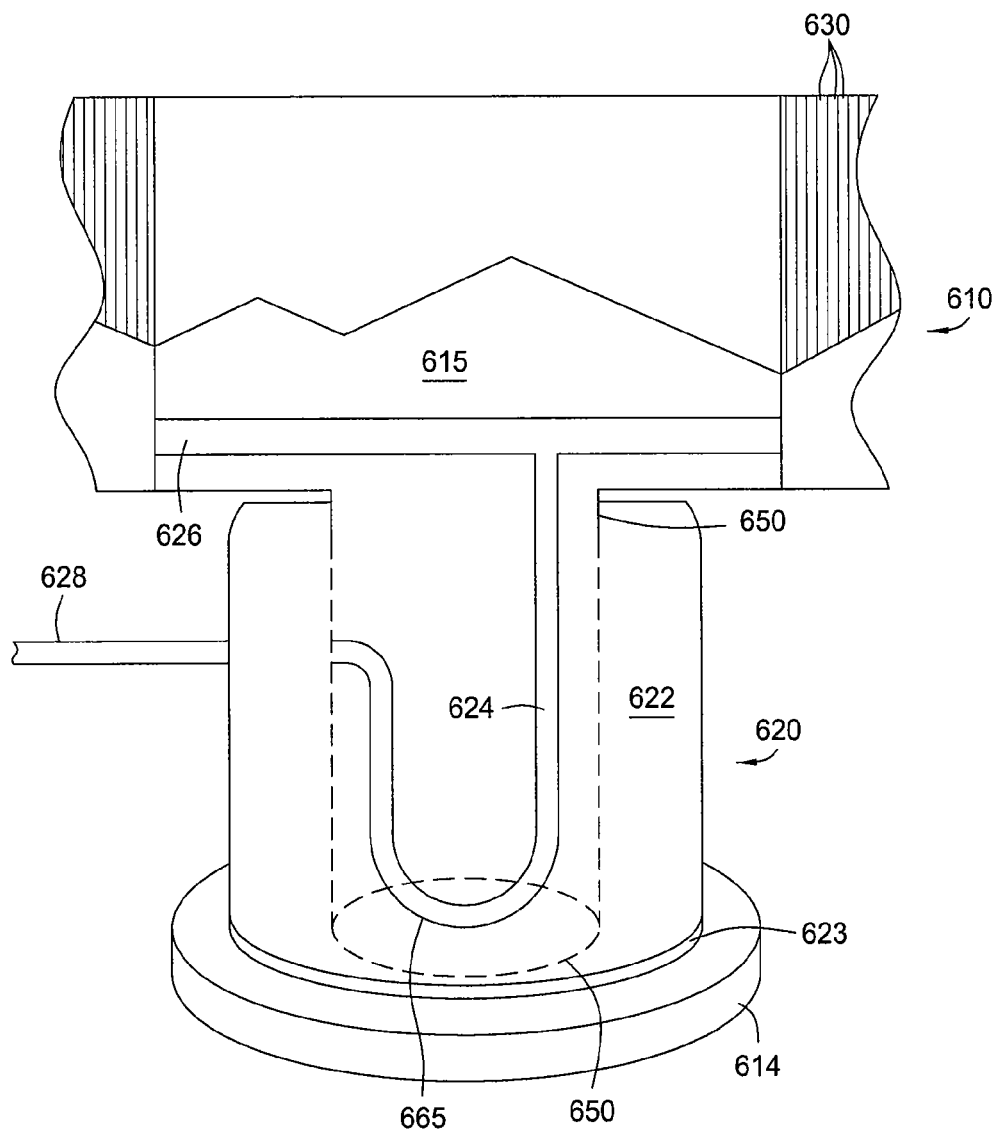
FIG. 6B is a schematic side view of another embodiment of a backwash system.

FIG. 6B is another embodiment of a backwash system 620 coupled to an intake screen assembly 610. In this embodiment, a tank 622 is formed around an outer surface of an inlet tube 650 having a fluid line 628 coupled thereto for supplying fluid from a compressor. A conduit 624, having a release run 665, is coupled to the tank 622 through a wall of the inlet tube 650. The conduit 624 is within the inside diameter of the inlet tube 650 and is coupled to a manifold 626 within the interior region of the intake screen assembly 610. As in other embodiments, the tank 622 may be refilled post-release by the orifices (not shown) or may be refilled by a bottom 623 formed between a lower surface of the tank 622 and an upper surface of a flange 614. The bottom 623 may be open or screened by the use of a filter. The backwash system 620 is configured to operate similarly as described in FIGS. 3A-3E to deliver a volume of fluid to the interior region of the intake screen assembly 610 sufficient to clear waterborne debris and aquatic life from the filtering members of the intake screen assembly 610. This embodiment of the backwash system 620 may also be used in the embodiments depicted in FIGS. 4A-4C.

While the foregoing is directed to embodiments of the present invention, other and further embodiments of the invention may be devised without departing from the basic scope thereof, and the scope thereof is determined by the claims that follow.

The invention claimed is:

1. A method of cleaning a filter that is submerged in a body of water, comprising:
supplying a gas to a tank that is filled with water and is submerged in the body of water;
displacing water from the tank to the body of water, while the tank fills with the gas;
forming a gas/water interface in the tank as the gas displaces water from the tank, wherein the gas/water interface is simultaneously reflected in a conduit that provides communication between the tank and the filter;
injecting the gas into the filter via the conduit; and
cleaning the filter with the gas that is injected into the filter via the conduit.

2. The method of claim 1, wherein the gas is compressed air, and further comprising supplying the compressed air to the tank via a compressor located onshore adjacent to the body of water.

3. The method of claim 1, further comprising expelling water through a lower portion of the tank and into the body of water, while the gas accumulates in an upper portion of the tank.

4. The method of claim 1, further comprising supplying the gas to the tank at a predetermined pressure, wherein the predetermined pressure is between about 5 pounds per square inch and about 45 pounds per square inch.

5. The method of claim 1, further comprising injecting a volume of the gas into an interior region of the filter, thereby displacing water from the interior region of the filter to the body of water.

6. The method of claim 5, wherein the volume of the gas injected into the interior region is between about 2 and about 3 times a volume of the interior region of the filter.

7. The method of claim 1, wherein the conduit includes a release run, and further comprising injecting a pulse of the gas into the filter when the gas/water interface in the conduit reaches the release run.

8. The method of claim 1, further comprising displacing at least a portion of the water from the tank through the conduit.

9. The method of claim 1, further comprising displacing at least a portion of the water from the tank through a filtered opening in the tank.

10. The method of claim 1, further comprising injecting the gas at predefined intervals.

11. The method of claim 1, wherein the conduit includes a U-shaped portion, and further comprising injecting a pulse of the gas into the filter via the U-shaped portion.

12. The method of claim 1, further comprising directing the gas to one or more locations within an interior region of the filter using a manifold assembly that is in communication with the conduit.

13. The method of claim 1, further comprising refilling the tank with water from the body of water.

14. The method of claim 1, further comprising collecting water for an onshore user through the filter after cleaning.

15. A method of cleaning a filter, comprising:
supplying a gas to a tank that is filled with water, thereby displacing water from the tank;

forming a gas/water interface in the tank and in a conduit that provides communication between the tank and the filter, while the water is displaced by the gas;

injecting the gas into the filter via the conduit; and removing debris from the filter using the gas that is injected into the filter.

16. The method of claim 15, wherein the conduit includes a release run, and further comprising injecting a pulse of the gas into the filter when the gas/water interface in the conduit reaches the release run.

17. The method of claim 15, further comprising displacing the water from the tank into a body of water in which the tank is submerged.

18. The method of claim 15, wherein the gas is compressed air, and further comprising supplying the compressed air to the tank via a compressor located onshore adjacent to a body of water in which the tank is submerged.

19. The method of claim 15, further comprising directing the gas to one or more locations within an interior region of the filter using a manifold assembly that is in communication with the conduit.

20. The method of claim 15, wherein the manifold assembly includes a plurality of orifices for directing the gas in at least one of a vertical direction and a radial direction within the filter.

21. The method of claim 15, wherein at least one of the tank and the conduit is at least partially disposed within or integral with the filter.

22. A method of cleaning a filter, comprising:

supplying a gas to a tank that is filled with water;

forming a gas/water interface in the tank and in a conduit that provides communication between the tank and the filter; and injecting the gas into the filter via the conduit to clean the filter.

23. The method of claim 22, wherein the conduit includes a release run, and further comprising injecting a pulse of the gas into the filter when the gas/water interface in the conduit reaches the release run.

24. The method of claim 22, wherein water in the tank is displaced into a body of water surrounding the tank.

* * * * *